United States Patent [19]
Chibata et al.

[11] 3,898,128
[45] Aug. 5, 1975

[54] PROCESS FOR PREPARING L-ALANINE

[75] Inventors: Ichiro Chibata, Suita; Tetsuya Tosa, Kyoto; Tadashi Sato; Kozo Yamamoto, both of Takatsuki, all of Japan

[73] Assignee: Tanabe Seiyaku Co. Ltd., Osaka, Japan

[22] Filed: Nov. 15, 1973

[21] Appl. No.: 416,185

[30] Foreign Application Priority Data
Nov. 20, 1972 Japan.............................. 47-116878

[52] U.S. Cl. ................................................. 195/29
[51] Int. Cl.² ......................................... C12D 13/06
[58] Field of Search ........................................ 195/29

[56] References Cited
UNITED STATES PATENTS
3,791,926  2/1974  Chibata et al. ...................... 195/29

OTHER PUBLICATIONS
Biochimica et Biophysica Acta, 252, (1971), p. 246–254.

*Primary Examiner*—Lionel M. Shapiro
*Assistant Examiner*—Robert J. Warden
*Attorney, Agent, or Firm*—Bierman & Bierman

[57] ABSTRACT

At least one monomer selected from the group consisting of acrylamide, N,N'-lower alkylene-bis(acrylamide) and bis(acrylamidomethyl)ether is polymerized in an aqueous suspension containing an L-aspartic acid β-decarboxylase-producing microorganism. The resultant immobilised L-aspartic acid β-decarboxylase-producing microorganism is subjected to enzymatic reaction with L-aspartic acid, DL-aspartic acid or a salt thereof. Pyridoxal phosphate, a divalent metal ion and/or a surface active agent are preferably added to the enzymatic reaction solution. On using L-aspartic acid or its salt as substrate, L-alanine is obtained. Alternatively, on using DL-aspartic acid or its salt as substrate, L-alanine and D-aspartic acid are obtained.

22 Claims, No Drawings

PROCESS FOR PREPARING L-ALANINE

This invention relates to a process for preparing L-alanine. It also relates to a process for preparing L-alanine and D-aspartic acid. More particularly, it relates to a process for preparing L-alanine, or L-alanine and D-aspartic acid by enzymatic reaction of an immobilized L-aspartic acid β-decarboxylase-producing microorganism with L-aspartic acid, DL-aspartic acid or a salt thereof.

It is well known in the art that L-aspartic acid β-decarboxylase (Enzyme Classification No.4-1-1-12) has the ability to convert L-aspartic acid or its salt into L-alanine. Various methods for producing L-alanine by the enzymatic reaction of L-aspartic acid β-decarboxylase with L-aspartic acid or its salt are known. For example, L-alanine can be prepared by cultivating an L-aspartic acid β-decarboxylase-producing microorganism in a nutrient medium, and reacting the cultivation broth with L-aspartic acid (Japanese Patent Publication No. 7560/1971). Alternatively, it can be prepared by extracting L-aspartic acid β-decarboxylase from a microorganism, and reacting the enzyme with L-aspartate (e.g., Biochimica et Biophisica Acta, volume 67 (1963)). However, L-alanine produced according to these methods is inevitably contaminated with the enzyme, microbial cells, nutrient sources of the medium and/or proteins. Accordingly, in order to prepare L-alanine having high purity, additional steps for removing the enzyme and other contaminants from the product are required. Furthermore, after the enzymatic reaction is completed, the reaction solution is boiled and/or acidified to precipitate the enzyme or an L-aspartic acid β-decarboxylase-producing microorganism and the precipitate is filtered off. Thus, the L-aspartic acid β-decarboxylase or the L-aspartic acid β-decarboxylase-producing microorganism can be used only once and must be discarded thereafter.

As the results of various investigations, we have now found that an L-aspartic acid β-decarboxylase-producing microorganism immobilized with a semipermeable membrane can be advantageously employed in the production of L-alanine.

According to the present invention, L-alanine can be prepared by polymerizing at least one monomer selected from the group consisting of acrylamide, N,N'-lower alkylene-bis (acrylamide) and bis(acrylamidomethyl)ether in an aqueous suspension of an L-aspartic acid β-decarboxylase-producing microorganism to produce an immobilized L-aspartic acid β-decarboxylase-producing microorganism, and subjecting the immobilized L-aspartic acid β-decarboxylase-producing microorganism to enzymatic reaction with L-aspartic acid, DL-aspartic acid or a salt thereof.

The polymerization reaction of the present invention is preferably carried out in the presence of a polymerization initiator and a polymerization accelerator. Potassium persulfate, ammonium persulfate, vitamin $B_2$ and methylene blue are suitable as the polymerization initiator. On the other hand, β-(dimethylamino)-propionitrile and N,N,N',N'-tetramethylethylenediamine are employed as the polymerization accelerator. It is preferred to carry out the reaction at 5° to 60°C, especially at 10° to 40°C. The reaction may be completed within 10 to 60 minutes.

Microorganisms which produce L-aspartic acid β-decarboxylase are employed for the purpose of the present invention. Examples of L-aspartic acid β-decarboxylase-producing microorganisms include *Acetobacter rancens* OUT (Faculty of Technology, Osaka University, Japan) No.8300, *Achromobacter pestifer* IAM (Institute of Applied Microbiology, Tokyo University, Japan) No.1446, *Achromobacter pestifer* ATCC No.23584, *Alcaligenes faecalis* ATCC No.25094, *Pseudomonas dacunhae* IAM No.1152. All of these microorganisms are publicly available from the abovementioned collections. However, it should be noted that the present invention is not limited to the use of these specific microorganisms, but includes within its scope the use of all of L-aspartic acid β-decarboxylase-producing microorganisms. The polymerization reaction of the present invention serves to tightly entrap each of the microorganisms into the latice of the polymer thereby affording high enzymatic activity for a long period of time.

L-alanine or a mixture of L-alanine and D-aspartic acid can be prepared by contacting the resultant immobilized microorganism with L-aspartic acid, DL-aspartic acid or a salt thereof. Suitable examples of the salts of L- and DL-aspartic acid include the ammonium, potassium, sodium salt and magnesium salts. When DL-aspartic acid or its salt is employed in the enzymatic reaction, D-aspartic acid also can be prepared together with L-alanine because D-aspartic acid in DL-aspartic acid is not effected by the immobilized L-aspartic acid β-decarboxylase-producing microorganism. Pyridoxal phosphate, a divalent metal ion (e.g., cobaltous ion, nickelous ion), and/or a surface active agent (e.g., polyethylene sorbitan mono-laurate, polyoxyethylene stearate) may be added to the enzymatic reaction to keep the enzymatic activity of the immobilized microorganism at a high level during the reaction. The preferred concentrations of pyridoxal phosphate, the divalent metal ion and the surface active agent are respectively about 0.05 to 10 milimoles/liter, about 0.1 to 10 milimoles/liter and about 0.05 to 1.0 w/v percent.

The concentration of substrate employed is not critical in the present invention. That is, L-aspartic acid, DL-aspartic acid or a salt thereof is dissolved in water in any concentration. The solution is then adjusted to a pH of 4 to 9. The aforementioned immobilized microorganism is suspended in the solution, and the mixture is incubated at 5° to 55°C, especially at 30° to 45°C, with stirring, until the reaction is completed. When the reaction is completed, the mixture is filtered or centrifuged. Thus, an aqueous solution containing L-alanine or a mixture of L-alanine and D-aspartic acid is obtained as the filtrate or supernatant liquid. L-alanine and/or D-aspartic acid are recovered from the filtrate or supernatant liquid in the conventional manners, for example, by applying the method of direct crystallization, the treatment with an ion-exchange resin, or the combination of these operations to the filtrate or supernatant liquid.

Alternatively, the enzymatic reaction of the present invention may be performed by a column method. The column method enables the reaction to be carried out in a successive manner. For example, the immobilized microorganism is charged into a column, and an aqueous solution (pH 4 to 9) containing L-aspartic acid, DL-aspartic acid or a salt thereof is passed through the column at 5° to 55°C, especially 30° to 45°C, and at a suitable flow rate. An aqueous solution containing L-alanine or a mixture of L-alanine and D-aspartic acid is obtained as the effluent. L-alanine and/or D-aspartic acid are recovered from the effluent in the same manner as applyed to the before-mentioned filtrate or supernatant liquid.

In carrying out the enzymatic reaction, the conversion rate of L-aspartic acid or its salt to L-alanine mainly depends upon the enzymatic potency of the immobilized microorganism, the temperature, the reaction time and the flow rate of a substrate solution. However, one can readily obtain the optimum reaction condition for complete conversion of L-aspartic acid to L-alanine by adjusting the reaction time in the case of a batch method or by adjusting the flow rate of the substrate solution in the case of a column method.

In any case, during the reaction the immobilized microorganism of the present invention retains a high level of enzymatic activity, especially in the presence of pyridoxal, a divalent metal ion and/or a surface active agent. Moreover, due to the sufficient durability of the enzymatic activity of the immobilized microorganism of the present invention, repeated use of the immobilized microorganism is possible.

Practical and presently-preferred embodiments of the present invention will be shown in the following Examples. In this specification, the terminology "lower alkylene" should be interpreted as referring to an alkylene group having one to five carbon atoms.

EXAMPLE 1

Pseudomonas dacunhae IAM No.1152 is inoculated into 200 ml of a nutrient medium (pH 7.0) containing 0.5 w/v percent ammonium fumarate, 1.0 w/v percent sodium fumarate, 0.55 w/v percent corn steep liquor, 1.8 w/v percent peptones, 0.05 w/v percent potassium dihydrophosphate and 0.01 w/v percent magnesium sulfate 7 hydrate. The medium is cultivated at 30°C for 24 hours under shaking. After the cultivation, the microbial cells of Pseudomonas dacunhae IAM No.1152 are collected by centrifugation. The microbial cells are suspended in 20 ml of physiological saline solution. 3.75 g of acrylamide, 0.2 g of N,N'-methylenebis(acrylamide), 2.5 ml of 5 percent β-(dimethylamino)-propionitrile and 2.5 ml of 2.5 percent potassium persulfate are added to the suspension. Then, the suspension is allowed to stand at 25°C for 10 minutes. The immobilized microbial cells are ground into pieces and then washed with physiological saline solution. 40 g of an immobilized preparation of Pseudomonas dacunhae IAM No.1152 are obtained.

40 g of the immobilized preparation of Pseudomonas dacunhae No.1152 are charged into a 1.6 cm × 19 cm column. 500 ml of a 1M-ammonium L-aspartate aqueous solution (pH 5.5) containing $10^{-4}$M-concentration of pyridoxal phosphate are continuously passed through the column at 37°C at a flow rate of 6 ml/hr. 500 ml of the effluent are concentrated to 150 ml. 150 ml of methanol are added to the concentrated effluent. The crystalline precipitate thus formed is collected by filtration and then washed with 30 ml of cold methanol. 40.1 g of L-alanine are obtained.

M.p. 270°C (decomp.)
$[\alpha]_D^{23} = + 14.4°$ (C = 6.46, 1N-HCl)

EXAMPLE 2

An immobilized preparation of Pseudomonas dacunhae IAM No.1152 is prepared in the manner described in Example 1. 40 g of the immobilized preparation are charged into a 1.6 cm × 19 cm column. A 1M-ammonium L-aspartate aqueous solution (pH 5.5) containing $10^{-4}$M-concentration of pyridoxal phosphate is continuously passed through the column at 37°C at a flow rate as shown in Table 1.

The concentration of L-alanine in the effluent is assayed biologically by using Leuconostoc citrovorum ATCC No. 8081 as a sensitive microorganism, and the percentage conversion of ammonium L-aspartate to L-alanine is calculated therefrom. The results are shown in Table 1.

Table 1

| Flow rate (ml/hr.) | Conversion rate to L-alanine (%) |
|---|---|
| 6 | 100 |
| 15 | 100 |
| 25 | 96 |
| 30 | 85 |
| 38 | 80 |
| 62.5 | 60 |
| 80 | 48 |
| 100 | 32 |
| 125 | 25 |

EXAMPLE 3

An immobilized preparation of Pseudomonas dacunhae IAM No.1152 is prepared in the manner described in Example 1. 40 g of the immobilized preparation are charged into a 1.6 cm × 19 cm column. A 1M-ammonium L-aspartate aqueous solution (pH 5.5) which may or may not contain $10^{-4}$M-concentration of pyridoxal phosphate is continuously passed through the column at a flow rate as shown in Table 2.

The concentration of L-alanine in the effluent obtained with the passage of time is assayed in the manner described in Example 2. The percentage conversion of ammonium L-aspartate to L-alanine is calculated therefrom. The results are shown in Table 2.

Table 2

| Operation time (days) | Conversion rate of ammonium L-aspartate to L-alanine (%) | | | |
|---|---|---|---|---|
| | No addition of pyridoxal phosphate | | Addition of pyridoxal phosphate | |
| | Flow rate | | Flow rate | |
| | 38 ml/hr. | 6 ml/hr. | 38 ml/hr. | 6 ml/hr. |
| 3 | 63 | 95 | 80 | 100 |
| 6 | 38 | 50 | 80 | 100 |
| 9 | 15 | 35 | 78 | 100 |
| 12 | 7 | 22 | 80 | 100 |
| 15 | 2 | 5 | 75 | 100 |
| 18 | 0 | 3 | 78 | 100 |
| 21 | — | 0 | 80 | 100 |
| 24 | — | 0 | 75 | 100 |
| 27 | — | — | 75 | 100 |
| 30 | — | — | 73 | 100 |

EXAMPLE 4

An immobilized preparation of Pseudomonas dacunhae IAM No.1152 is prepared in the manner described in Example 1. 40 g of the immobilized preparation are suspended in 500 ml of a 1M-ammonium L-aspartase aqueous solution (pH 5.5). The suspension is stirred at 37°C for a period of time.

The concentration of L-alanine in the suspension is assayed in the manner described in Example 2, and the percentage conversion of ammonium L-aspartate to L- alanine is calculated therefrom. The results are shown in Table 3.

Table 3

| Reaction time (hr.) | Conversion rate to L-alanine (%) |
|---|---|
| 2 | 15 |
| 4 | 30 |
| 6 | 45 |
| 8 | 60 |
| 20 | 100 |
| 24 | 100 |

After stirring for 24 hours, the suspension is filtered. 500 ml of the filtrate are concentrated to 150 ml. 150 ml of ethanol are added to the concentrated filtrate. The crystalline precipitate thus formed is collected by filtration, and then washed with cold methanol. 39.3 g of L-alanine are obtained.

M.p. 270°C (decomp.)
$[\alpha]_D^{23} = +14.4°$ (C = 6.46, 1N-HCl)

EXAMPLE 5

*Acromobactor pestifer* IAM No.1446 is inoculated in 250 ml of a nutrient medium (pH 7.0) containing 0.5 w/v percent ammonium fumarate, 1.0 w/v percent sodium fumarate, 0.55 w/v percent corn steep liquor, 1.8 w/v percent peptones, 0.05 w/v percent potassium dihydrophosphate and 0.01 w/v percent of magnesium sulfate 7 hydrate. The medium is cultivated at 30°C for 24 hours under shaking. After the cultivation, the microbial cells of *Achromobacter pestifer* IAM No.1446 are collected by centrifugation. The microbial cells are suspended in 20 ml of physiological saline solution. 3.75 g of acrylamide, 0.2 g of N,N'-methylene-bis(acrylamide), 2.5 ml of 5 percent β-(dimethylamino)-propionitrile and 2.5 ml of 2.5 percent potassium persalfate are added to the suspension. Then, the suspension is allowed to stand at 25°C for 10 minutes. The immobilized microbial cells are ground into pieces and then washed with physiological saline solution. 40 g of an immobilized preparation of Achromobacter pestifer IAM No.1446 are charged into a 1.6 cm × 19 cm column. 500 ml of a 1M-ammonium L-aspartate aqueous solution (pH 5.5) containing 0.1 w/v percent polyoxyethylene sorbitan mono-laurate and $10^{-4}$M-concentration of pyridoxal phosphate are continuously passed through the column at 37°C at a flow rate of 3 ml/hr. 500 ml of the effluent are concentrated to 150 ml. 150 ml of methanol are added to the concentrated effluent. The crystalline precipitate thus formed is collected by filtration and then washed with cold methanol. 40.0 g of L-alanine are obtained.

M.p. 270°C (decomp.)
$[\alpha]_D^{23} = +14.4°$ (C = 6.46, 1N-HCl)

EXAMPLE 6

*Alcaligenes faecalis* ATCC No.25094 is inoculated in one liter of a nutrient medium (pH 7.0) containing 0.68 w/v percent sodium succinate, 0.067 w/v percent ammonium chloride, 0.032 w/v percent calcium chloride, 0.004 w/v percent ferric chloride, 0.03 w/v percent manganic chloride, 0.075 w/v percent potassium dihydrophosphate, 0.02 w/v percent magnesium sulfate 7 hydrate and 0.001 w/v percent sodium molybdate. The medium is cultivated at 30°C for 24 hours. Microbial cells of *Alcaligenes faecalis* ATCC No.25094 are collected by centrifugation, and then suspended in 16 ml of physiological saline solution. 3.0 g of acrylamide, 0.16 g of N,N'-methylenebis(acrylamide), 2.0 ml of 5 percent β-(dimethylamino)-propionitrile and 2.0 ml of 2.5 percent potassium persulfate are added to the suspension. The mixture is allowed to stand at 25°C for 10 minutes. The immobilized microbial cells are ground into pieces and then washed with physiological saline solution. 32 g of an immobilized preparation of *Alcaligenes faecalis* ATCC No.25094 are charged into a 1.6 cm × 15 cm column. 500 ml of a 1M-ammonium aspartate aqueous solution (pH 5.5) containing $10^{-4}$M-concentration of pyridoxal phosphate are continuously passed through the column at 37°C at a flow rate of 3 ml/hr. 500 ml of the effluent are concentrated to 150 ml. 150 ml of methanol are added to the concentrated effluent. The crystalline precipitate thus formed is collected by filtration and then washed with cold methanol. 40.2 g of L-alanine are obtained.

M.p. 270°C (decomp.)
$[\alpha]_D^{23} = +14.4°$ (C = 6.46, 1N-HCl)

EXAMPLE 7

An immobilized preparation of *Pseudomonas dacunhae* IAM No.1152 is prepared in the manner described in Example 1. 40 g of the immobilized preparation are charged into a 1.6 cm × 19 cm column. 500 ml of a 1M-ammonium DL-aspartate aqueous solution (pH 5.5) containing $10^{-4}$M-concentration of pyridoxal phosphate are continuously passed through the column at 37°C at a flow rate of 6 ml/hr. 500 ml of the effluent are concentrated to 100 ml. The concentrated effluent is adjusted to pH 3.0, boiled and then allowed to stand at 5°C overnight. The crystalline precipitate thus formed is collected by filtration and then washed with ice-water. 30.5 g of D-aspartic acid are obtained.

$[\alpha]_D^{25} = -24.9°$ (C = 2, 5N-HCl)

The filtrate obtained after the isolation of D-aspartic acid is continuously passed through a column charged with Amberlite IRC-50 (H$^+$type). After washing the column with water, L-alanine is eluted with a 5 percent ammonium hydroxide aqueous solution. The eluate is concentrated under reduced pressure, and methanol is added to the concentrated eluate. 18.3 g of L-alanine are obtained.

M.p. 270°C (decomp.)
$[\alpha]_D^{23} = +14.4°$ (C = 6.46, 1N-HCl)

EXAMPLE 8

An immobilized preparation of *Pseudomonas dacunhae* IAM 1152 is prepared in the manner described in Example 1. 8 g of the immobilized preparation (corresponding to 1 g of microbiol cells) are stored in 40 ml of 1M-ammonium L-aspartate aqueous solution (pH 5.5) containing $10^{-4}$M-concentration of pyridoxal phosphate and $10^{-3}$M-concentration of metal ion. At appropriate intervals the immobilized preparation was washed with physiological saline solution and reacted with 40 ml of 1M-ammonium L-aspartate aqueous solution (pH 5.5) containing $10^{-4}$M-concentration of pyridoxal phosphate and $10^{-3}$M-concentration of metal ion at 37°C for 1 hour with shaking. The formation of L-alanine is determined in the manner described in Example 2. The results are shown in Table 4.

Table 4

| Storage time (days) | L-Alanine Formation ($\mu$ moles/hr/g of cells) | | |
|---|---|---|---|
| | No addition of metal ion | Addition of $Co^{++}$ | Addition of $Ni^{++}$ |
| 0 | 4,080 | 3,730 | 3,660 |
| 1 | 3,900 | 4,140 | 4,080 |
| 4 | 3,060 | 4,200 | 3,780 |
| 11 | 2,300 | 3,020 | 2,830 |
| 18 | 1,840 | 2,560 | 2,160 |
| 21 | 1,480 | 2,160 | 1,864 |

EXAMPLE 9

An immobilized preparation of *Pseudomonas dacunhae* IAM 1152 is prepared in the manner described in Example 1. 40 g of the immobilized preparation are charged into a 1.6 cm × 19 cm column. A 1M-ammonium L-aspartate aqueous solution (pH 5.5) containing $10^{-4}$M-concentration of pyridoxal phosphate and $10^{-3}$M-concentration of $Co^{++}$ is continuously passed through the column at a flow rate of 6 ml/hr. The concentration of L-alanine in the effluent obtained with the passage of time is assayed in the manner described in Example 2. The percentage conversion of ammonium L-aspartate to L-alanine is calculated therefrom. The results are shown in Table 5.

Table 5

| Operation time (days) | Conversion rate of L-aspartate to L-alanine (%) | |
|---|---|---|
| | No addition of $Co^{++}$ | Addition of $Co^{++}$ |
| 6 | 100 | 100 |
| 12 | 100 | 100 |
| 18 | 100 | 100 |
| 24 | 100 | 100 |
| 30 | 100 | 100 |
| 36 | 100 | 100 |
| 42 | 92 | 100 |
| 48 | 75 | 100 |
| 54 | 55 | 100 |
| 60 | 45 | 95 |
| 66 | 40 | 92 |
| 72 | — | 90 |
| 78 | — | 90 |
| 84 | — | 90 |

EXAMPLE 10

3 g of the microbiol cells of *Pseudomonas dacunhae* IAM 1152 are suspended in 12 ml of a physiological saline solution. 2.25 g of acrylamide, 120 mg of N,N'-propylene-bis (acrylamide), 1.5 ml of 2.5 percent potassium persulfate are added to the suspension. Then, the suspension is allowed to stand at 25°C for 10 minutes. The insoluble product is ground and washed with a physiological saline solution. 24 g of an immobilized preparation of *Pseudomonas dacunhae* IAM 1152 are obtained.

24 g of the immobilized preparation of *Pseudomonas dacunhae* IAM 1152 are suspended into 500 ml of an aqueous 1M-ammonium L-aspartate solution (pH 5.5). The enzymic reaction is carried out in the same manner as described in Example 4, and the results are shown in Table 6.

Table 6

| Reaction time (hr.) | Conversion rate to L-alanine (%) |
|---|---|
| 8 | 40 |
| 24 | 100 |
| 30 | 100 |

EXAMPLE 11

3 g of the microbiol cells of *Pseudomonas dacunhae* IAM 1152 are suspended in 12 ml of a physiological saline solution. 2.25 g of acrylamide, 120 mg of bis(a-crylamidomethyl) ether, 1.5 ml of 5 percent β-(dimethylamino)-propionitrile and 1.5 ml of 2.5 percent potassium persulfate are added to the suspension. Then, the suspension is allowed to stand at 25°C for 10 minutes. The insoluble product is ground and washed with a physiological saline solution. 23 g of an immobilized preparation of *Pseudomonas dacunhae* IAM 1152 are obtained.

23 g of the immobilized preparation of *Pseudomonas dacunhae* IAM 1152 are suspended in 500 ml of an aqueous 1M-ammonium L-aspartate solution (pH 5.5). The enzymic reaction is carried out in the same manner as described in Example 4, and the results are shown in Table 7.

Table 7

| Reaction time (hr.) | Conversion rate to L-alanine (%) |
|---|---|
| 8 | 30 |
| 24 | 95 |
| 30 | 100 |

EXAMPLE 12

3 g of the microbiol cells of *Pseudomonas dacunhae* IAM 1152 are suspended in 12 ml of a physiological saline solution. 30 mg of N,N'-methylene-bis(acrylamide), 0.9 ml of 0.112 percent N,N,N',N'-tetramethylethylenediamine and 0.1 ml of 2.5 percent ammonium persulfate are added to the suspension. Then, the suspension is allowed to stand at 37°C for 60 minutes. 21 g of the immobilized preparation of *Pseudomonas dacunhae* IAM 1152 are obtained.

21 g of the immobilized preparation of *Pseudomonas dacunhae* IAM 1152 are suspended in 500 ml of an aqueous 1M-ammonium L-aspartate solution (pH 5.5). The enzymic reaction is carried out in the same manner as described in Example 4, and the results are shown in Table 8.

Table 8

| Reaction time (hr.) | Conversion rate to L-alanine (%) |
|---|---|
| 8 | 35 |
| 24 | 100 |
| 30 | 100 |

EXAMPLE 13

3 g of the microbiol cells of *Pseudomonas dacunhae* IAM 1152 are suspended in 12 ml of a physiological saline solution. 30 mg of N,N'-propylenebis(acrylamide), 0.9 ml of 0.112 percent N,N,N',N'-tetramethylethylenediamine and 0.1 ml of 2.5 percent ammonium persulfate are added to the suspension. Then, the suspension is allowed to stand at 37°C for 60 minutes. 24 g of the immobilized preparation of *Pseudomonas dacunhae* IAM 1152 are obtained.

24 g of the immobilized preparation of *Pseudomonas dacunhae* IAM 1152 are suspended in 500 ml of an aqueous 1M-ammonium L-aspartate solution (pH 5.5). The enzymic reaction is carried out in the same manner as described in Example 4, and the results are shown in Table 9.

Table 9

| Reaction time (hr.) | Conversion rate to L-alanine (%) |
|---|---|
| 8 | 30 |
| 24 | 90 |
| 30 | 100 |

EXAMPLE 14

3 g of the microbiol cells of *Pseudomonas dacunhae* IAM 1152 are suspended in 12 ml of a physiological saline solution. 30 mg of bis(acrylamidomethyl)ether, 0.9 ml of 0.112 percent N,N,N',N'-tetramethylethylenediamine and 0.1 ml of 2.5 percent ammonium persulfate are added to the suspension. Then, the suspension is allowed to stand at 37°C for 60 minutes. 25 g of the immobilized preparation of *Pseudomonas dacunhae* IAM 1152 are obtained.

25 g of the immobilized preparation of *Pseudomonas dacunhae* IAM 1152 are suspended in 500 ml of an aqueous 1M-ammonium L-aspartate solution (pH 5.5). The enzymic reaction is carried out in the same manner as described in Example 4, and the results are shown in Table 10.

Table 10

| Reaction time (hr.) | Conversion rate to L-alanine (%) |
|---|---|
| 8 | 35 |
| 24 | 90 |
| 30 | 100 |

What we claim is:

1. A process for preparing L-alanine or a mixture of L-alanine and D-aspartic acid which comprises polymerizing at least one monomer selected from the group consisting of acrylamide, N,N'-lower alkylene-bis (acrylamide) and bis (acrylamidomethyl) ether in an aqueous suspension of an L-aspartic acid $\beta$-decarboxylase-producing microorganism to produce an immobilized L-aspartic acid $\beta$-decarboxylase-producing microorganism, and subjecting the immobilized L-aspartic acid $\beta$-decarboxylase-producing microorganism to enzymatic reaction with L-aspartic acid, DL-aspartic acid or a salt thereof in the presence of 0.1 to 10 milimoles/liter of $Co^{++}$ or $Ni^{++}$-ion.

2. The process of claim 1 in which the microorganism is *Acetobacter rancens* O.U.T. No. 8300, *Achromobacter pestifer* I.A.M. No. 1446, *Achromobacter pestifer* A.T.C.C. No. 23584, *Alcaligenes faecalis* A.T.C.C. No. 25094, or *pseudomonas dacunhae* I.A.M. No. 1152.

3. The process according to claim 1, wherein the L-aspartic acid $\beta$-decarboxylase-producing microorganism is *Pseudomonas dacunhae* IAM 1152.

4. The process according to claim 1, wherein the salt of L- or DL-aspartic acid is selected from the group consisting of ammonium L- or DL-aspartate, sodium L- or DL-aspartate and magnesium L- or Dl-aspartate.

5. The process according to claim 1, wherein the enzymatic reaction is carried out in the presence of 0.05 to 10 milimoles/liter of pyriodoxal phosphate.

6. The process according to claim 1, wherein the enzymatic reaction is carried out in the presence of 0.05 to 1.0 w/v percent of a surface active agent.

7. The process according to claim 1, wherein the polymerization reaction is carried out at 5° to 60°C in the presence of a polymerization initiator and a polymerization accelerator, and the enzymatic reaction is carried out at 0° to 60°C at a pH of 4 to 9.

8. The process according to claim 7, wherein the polymerization initiator is selected from the group consisting of potassium persulfate, ammonium persulfate, vitamin $B_2$ and methylene Blue, and the polymerization accelerator is selected from the group consisting of $\beta$-(dimethylamino)-propionitrile and N,N,N',N'-tetramethyl-ethylenediamine.

9. The process according to claim 8, wherein the L-aspartic acid $\beta$-decarboxylase-producing microorganism is *Pseudomonas dacunhae* IAM 1152.

10. The process according to claim 8, wherein the salt of L- or DL-aspartic acid is selected from the group consisting of ammonium L- or DL-aspartate, potassium L- or DL-aspartate, sodium L- or DL-aspartate and magnesium L- or DL-aspartate.

11. The process according to claim 8, wherein the enzymatic reaction is carried out in the presence of 0.05 to 10 milimoles of pyridoxal phosphate.

12. The process according to claim 8, wherein the enzymatic reaction is carried out in the presence of 0.05 to 1.0 w/v percent of a surface active agent.

13. The process according to claim 8, wherein the polymerization initiator is selected from the group consisting of potassium persulfate, ammonium persulfate, vitamin $B_2$ and methylene Blue, and the polymerization accelerator is selected from the group consisting of -(dimethylamino)-propionitrile and N,N,N',N'-tetramethyl-ethylenediamine.

14. A process for preparing L-alanine or a mixture of L-alanine and D-aspartic acid which comprises copolymerizing acrylamide with N,N'-lower alkylene-bis (acrylamide) or bis (acrylamidomethyl) ether in an aqueous suspension of an L-aspartic acid $\beta$-decarboxylase-producing microorganism at 5° to 60°C in the presence of a polymerization initiator and a polymerization accelerator to produce an immobilized L-aspartic acid $\beta$-decarboxylase-producing microorganism, and subjecting the immobilized L-aspartic acid $\beta$-decarboxylase-producing microorganism to enzymatic reaction with L-aspartic acid, DL-aspartic acid or a salt thereof at 0° to 60°C at a pH of 4 to 9 in the presence of 0.1 to 10 milimoles/liter of $Co^{++}$ or $Ni^{++}$-ion.

15. The process of claim 14 in which the microorganism is *Acetobacter rancens* O.U.T. No. 8300, *Achromobacter pestifer* I.A.M. No. 1446, *Achromobacter pestifer* A.T.C.C. No. 23584, *Alcaligenes faecalis* A.T.C.C. No. 25094, or *Pseudomonas dacunhae* I.A.M. No. 1152.

16. The process according to claim 14, wherein the L-aspartic acid β-decarboxylase-producing microorganism is *Pseudomonas dacunhae* IAM 1152.

17. The process according to claim 14, wherein the salt of L- or DL-aspartic acid is selected from the group consisting of ammonium L- or DL-aspartate, potassium L- or DL-aspartate, sodium L- or DL-aspartate and magnesium L- or DL-aspartate.

18. The process according to claim 14, wherein the enzymatic reaction is carried out in the presence of 0.05 to 10 milimoles of pyridoxal phosphate.

19. The process according to claim 14, wherein the enzymatic reaction is carried out in the presence of 0.05 to 1.0 w/v percent of a surface active agent.

20. The process according to claim 14, wherein the polymerization initiator is selected from the group consisting of potassium persulfate, ammonium persulfate, vitamin $B_2$ and methylene Blue, and the polymerization accelerator is selected from the group consisting of β-(dimethylamino)-propionitrile and N,N,N',N'-tetramethyl-ethylenediamine.

21. A process for preparing L-alanine or a mixture of L-alanine and D-aspartic acid which comprises polymerizing N,N'-lower alkylene-bis (acrylamide) or bis (acrylamidomethyl) ether in an aqueous suspension of an L-aspartic acid β-decarboxylase-producing microorganism at 5° to 60°C in the presence of a polymerization initiator and a polymerization accelerator to produce an immobilized L-aspartic acid β-decarboxylase-producing microorganism, and subjecting the immobilized L-aspartic acid β-decarboxylase-producing microorganism to enzymatic reaction with L-aspartic acid, DL-aspartic acid or a salt thereof at 0° to 60°C at a pH of 4 to 9 in the presence of 0.1 to 10 milimoles/liter of $Co^{++}$ or $Ni^{++}$-ion.

22. The process of claim 21 in which the microorganism is *Acetobacter rancens* O.U.T. No. 8300, *Achromobacter pestifer* I.A.M. No. 1446, *Achromobacter pestifer* A.T.C.C. No. 23584, *Alcaligenes faecalis* A.T.C.C. No. 25094, or *Pseudomonas dacunhae* I.A.M. No. 1152.

* * * * *